No. 785,006. PATENTED MAR. 14, 1905.
N. W. LA CLAIR.
NAILLESS HORSESHOE.
APPLICATION FILED MAR. 12, 1904.
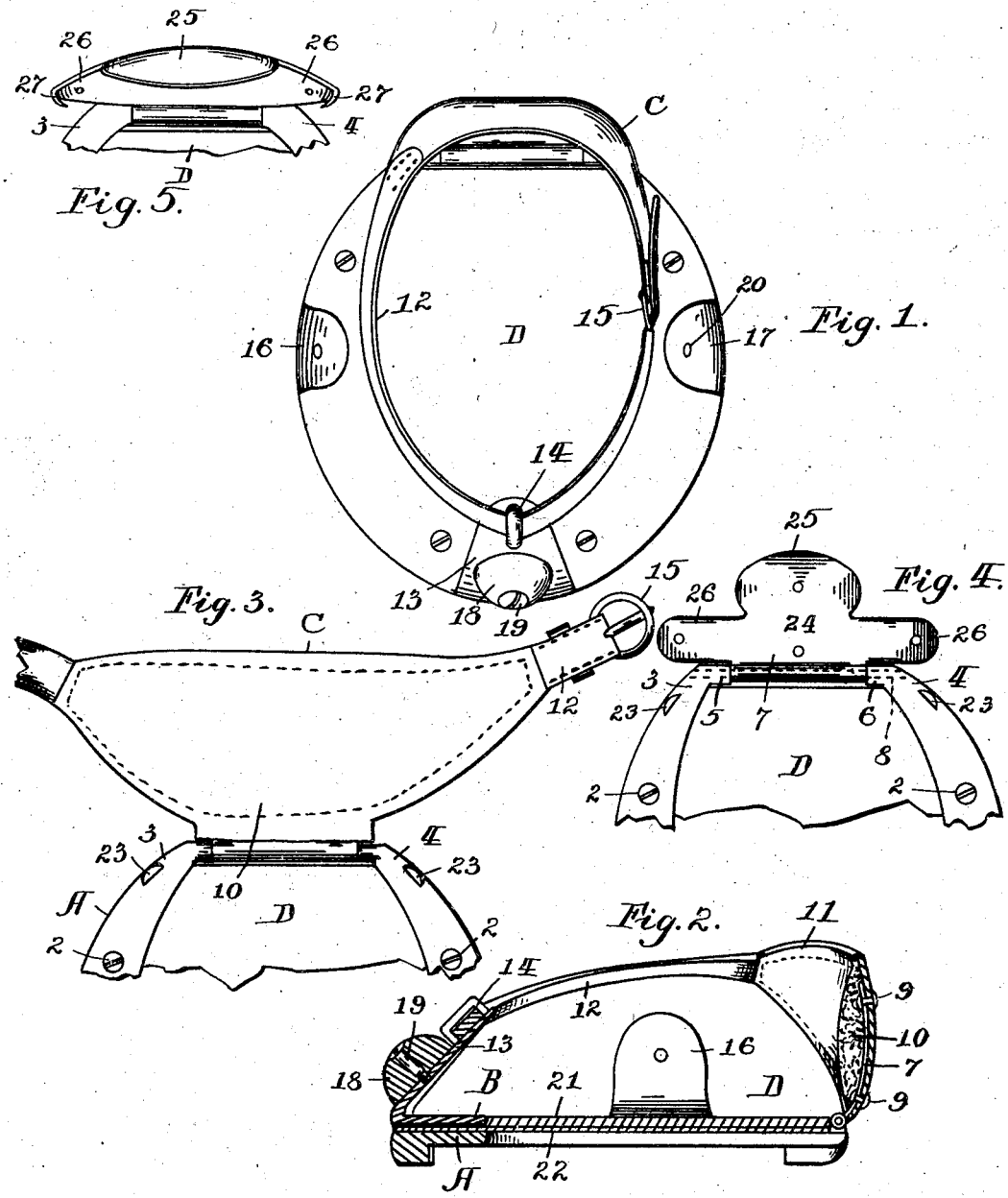

No. 785,006.

Patented March 14, 1905.

UNITED STATES PATENT OFFICE.

NORMAN W. LA CLAIR, OF ST. PAUL, MINNESOTA, ASSIGNOR OF ONE-HALF TO IDA M. SHUEMAKER, OF ST. PAUL, MINNESOTA.

NAILLESS HORSESHOE.

SPECIFICATION forming part of Letters Patent No. 785,006, dated March 14, 1905.

Application filed March 12, 1904. Serial No. 197,784.

*To all whom it may concern:*

Be it known that I, NORMAN W. LA CLAIR, a citizen of the United States of America, and a resident of St. Paul, in the county of Ramsey and State of Minnesota, have invented certain new and useful Improvements in Nailless Horseshoes, of which the following is a specification.

My invention relates to improvements in nailless horseshoes, and is adapted more particularly as an improvement upon that type of horseshoe which comprises a framework to which the horseshoe proper is attached, clips on the framework for assisting in holding it in place on the hoof, and a strap or straps connected to opposite sides of the rear portion of said framework and adapted to embrace the horse's hoof.

The object of this invention is to securely fasten the parts of the shoe to the hoof and prevent soreness of the frog and other portions of the hoof.

Further objects are simplicity of construction and effectiveness in use.

In the accompanying drawings, forming part of this specification, Figure 1 is a plan view of my invention. Fig. 2 is a longitudinal section in elevation of Fig. 1. Fig. 3 is a detail view showing the counter turned back. Fig. 4 is another detail view showing the counter removed from the hinge which attaches it to the shoe-plate, and Fig. 5 is a detail view of an alternate construction.

In the drawings let A represent the body or shoe proper of my improved nailless horseshoe, and B a crown-plate which is detachably connected to said body by means of the screws 2, this construction being preferable because it permits replacing the shoe on the crown-plate when it is worn or broken. The crown-plate is made of steel or other suitable material and conforms in shape to the shoe proper. It has its rear ends 3 and 4 provided with pintle connections 5 and 6, to which the hinge 7 is attached by means of the pin 8. What I have chosen to term the "counter" C is fastened to the hinge by means of the rivets 9. This counter is padded at 10 on its inner surface and covers the frog of the hoof. The ends 11, which are formed on the counter, extend around the sides of the hoof and are suitably fastened to the strap 12, (preferably made of leather or other soft material,) which is adapted to embrace the hoof when the shoe is attached thereto.

The clip 13 is formed on the crown-plate and extends over the toe of the hoof, so as to engage the same and assist in holding the shoe on the hoof. This clip has a loop 14 on its outer face, through which the strap 12 is passed when the shoe is fastened on the hoof. A buckle 15, attached to the strap, is used for adjusting the same in place. Clips 16 and 17 are also formed on the plate B, at either side thereof, as shown in Fig. 1, and are adapted to engage the hoof. The position of these clips is such that the shoe slides into place on the hoof when it is adjusted thereto. A weight 18 may be fastened on any of the clips when desired by means of the screw 19, which is threaded into the openings 20 in the clips for the purpose of training the foot in position. Two strips 21 and 22, comprising a pad D, are fastened between the shoe proper and the crown-plate by means of the screws 2, which secure the plate to the shoe. This pad may be made of any suitable material, such as leather or rubber, and is for the purpose of protecting the frog of the hoof. When applied to the shoe, it forms a pocket below the hoof, in which may be placed medicaments for treating the hoof when desired. This pad also prevents gravel catching between the shoe and hoof and snow from balling upon the exterior portion of the shoe and hoof. A pair of small clips 23 are formed on the upper surface adjoining the ends of the crown-plate and are adapted to engage the heel portions of the hoof.

In use the counter is turned back into the position shown in Fig. 3. The shoe is then passed into position on the hoof, so that all of the clips engage the same. The counter is then turned up and the strap 12 passed around the hoof through the loop 14 and adjusted in position by means of the buckle 15.

The hinge 7 is preferably shaped to support the padding, its inner surface 24 being concave. It is formed with an upwardly-projecting portion 25, which extends over the back of the hoof, and with two arms 26, which pass around the sides of the hoof. In the alternate construction shown in Fig. 5 the arms 26 are formed with indents 27, which engage the hoof when the hinge and counter are turned up.

Having described my invention, what I claim as new, and desire to protect by Letters Patent, is—

1. A nailless horseshoe, consisting, in combination with the body or shoe proper, of a crown-plate, a pad for protecting the frog of the hoof, means for fastening said crown-plate and pad to said body, a counter hinged upon the ends of said crown-plate, a strap connected with said counter and passing around the hoof, clips on the toe end and sides of said crown-plate for engaging the hoof, and a loop on one of said clips at said toe end, through which said strap is adapted to be adjusted.

2. A nailless horseshoe, consisting, in combination with the shoe proper, of a crown-plate, means for fastening said crown-plate to said shoe, clips on said crown-plate for engaging the hoof, a counter in turning connection with said crown-plate at the back of the hoof, and a strap connected with said counter and adapted to embrace the hoof, for the purposes specified.

3. A nailless horseshoe, consisting, in combination with the shoe proper, of a crown-plate, means for fastening the shoe to said crown-plate, clips projecting up at the toe portion and sides of said crown-plate for engaging said hoof, a counter at the back of the hoof, a hinged connection between said counter and crown-plate, a strap adjusted to said counter, and a loop on one of said clips at the toe portion of the plate, through which said strap is passed.

4. A nailless horseshoe, consisting, in combination with the shoe proper, of a crown-plate, a pad, means for detachably fastening said pad and crown-plate to said shoe, clips extending up from the toe and sides of said crown-plate for engaging the hoof, a counter at the back of the shoe, a turning connection between said counter and crown-plate, a strap adjusted to said counter, and a connection between said clip near the toe end of the crown-plate and said strap.

5. A nailless horseshoe, consisting, in combination, of a shoe proper A, a crown-plate B, a pad protecting the frog of the hoof, screws 2 by which the plate and pad are fastened to the shoe, a counter C at the back of the hoof, a hinge 7 connected with said plate, indents on the hinge for engaging the hoof, a strap 12 adjusted to the ends of the counter, clips 13, 16 and 17 extending up from the toe portion and sides of the plate, and a loop 14, through which said strap is adapted to be passed.

In testimony whereof I have signed my name to this specification in the presence of two subscribing witnesses.

NORMAN W. LA CLAIR.

Witnesses:
   E. M. BOESEL,
   F. G. BRADBURY.